US 6,652,405 B2

(12) United States Patent
Staheli et al.

(10) Patent No.: US 6,652,405 B2
(45) Date of Patent: Nov. 25, 2003

(54) MULTI-SPEED WHEEL HUB FOR AUTOMOTIVE VEHICLES

(75) Inventors: Glen Walter Staheli, St. Albert (CA); Ernst Auer, Munich (DE)

(73) Assignee: DT Planetaries Inc., Edmonton (CA)

( * ) Notice: Subject to any disclaimer, the term of this patent is extended or adjusted under 35 U.S.C. 154(b) by 0 days.

(21) Appl. No.: 09/995,940

(22) Filed: Nov. 28, 2001

(65) Prior Publication Data

US 2002/0187870 A1 Dec. 12, 2002

(30) Foreign Application Priority Data

Jun. 12, 2001 (CA) .............................................. 2350263

(51) Int. Cl.⁷ .............................. B60K 17/04; F16H 3/44
(52) U.S. Cl. ........................ 475/138; 475/142; 180/372
(58) Field of Search ................................ 475/138, 142, 475/269; 180/371, 372

(56) References Cited

U.S. PATENT DOCUMENTS

| 1,436,817 A | | 11/1922 | Ovren | |
| 1,514,872 A | | 11/1924 | Starr | |
| 2,583,556 A | | 1/1952 | Fleischel | 74/789 |
| 3,184,985 A | * | 5/1965 | Dreitzler | 180/371 |
| 4,083,421 A | | 4/1978 | Van Horn et al. | 180/88 |
| 4,159,657 A | * | 7/1979 | Stilley | 475/331 |
| 4,569,252 A | | 2/1986 | Harper | 74/785 |
| 4,611,506 A | | 9/1986 | Groothius | 74/794 |
| 4,782,722 A | | 11/1988 | Powell | 74/750 |
| 5,006,100 A | | 4/1991 | Brandt et al. | 475/138 |
| 5,024,636 A | * | 6/1991 | Phebus et al. | 475/141 |
| 5,362,081 A | | 11/1994 | Beidler et al. | 280/250.1 |
| 5,472,062 A | * | 12/1995 | Nagai et al. | 180/252 |
| 5,478,290 A | | 12/1995 | Buuck et al. | 475/140 |
| 5,525,115 A | | 6/1996 | Vanzini | 475/146 |
| 5,908,080 A | | 6/1999 | Bigley et al. | 180/247 |
| 6,090,006 A | * | 7/2000 | Kingston | 475/323 |
| 6,117,040 A | | 9/2000 | Watterodt et al. | 475/299 |
| 6,290,048 B1 | * | 9/2001 | Kohlmeier et al. | 475/323 |
| 6,458,057 B2 | * | 10/2002 | Massaccesi et al. | 475/302 |

FOREIGN PATENT DOCUMENTS

| DE | G9318634.7 | 3/1994 | ............ F16H/3/46 |
| FR | 1.597.388 | 6/1970 | ........... B60B/35/00 |

* cited by examiner

Primary Examiner—Ankur Parekh
(74) Attorney, Agent, or Firm—Davis & Bujold, P.L.L.C.

(57) ABSTRACT

A multi-speed wheel hub includes a sun gear engagement clutch and a housing engagement clutch. A single shift ring is coupled to and rotates with the input member. The shift ring is positioned between the sun gear engagement clutch and the housing engagement clutch. The shift ring is axially movable along the input member. Upon movement of the shift ring in a first direction, a first engagement clutch of the shift ring engages the sun gear engagement clutch so that torque from the input member is transmitted by the shift ring to the sun gear through a planet carrier and a ring gear to the housing. Upon movement of the shift ring in a second direction a second engagement clutch of the shift ring engages the housing engagement clutch so that torque from the input member is transmitted by the shift ring directly to the housing.

2 Claims, 3 Drawing Sheets

MULTI-SPEED WHEEL HUB FOR AUTOMOTIVE VEHICLES

FIELD OF THE INVENTION

The present invention relates to a multi-speed wheel hub for automotive vehicles

BACKGROUND OF THE INVENTION

U.S. Pat. No. 6,117,040 (Watterodt and Staheli) describes a multi-speed wheel hub with a shifting system for a planetary gear configuration having an input member which includes a sun gear, a planet carrier with a plurality of planet gears and a ring gear disposed about the planet gears. The shifting system includes a first shift ring, a second shift ring and means for shifting the first shift ring and the second shift ring. When the first shift ring is engaged and the second shift ring is disengaged, the ring gear is locked to the hub body so that torque is transmitted from the sun gear through the planet carrier to the wheel. When the first shift ring is disengaged and the second shift ring is engaged, the ring gear is unlocked from the hub body and the planet carrier is locked to the input member so that torque is transmitted from the sun gear to the wheel.

SUMMARY OF THE INVENTION

What present invention relates to an alternative configuration of multi-speed wheel hub.

According to the present invention there is provided a multi-speed wheel hub which includes a hub body and an input member disposed within the hub body. A sun gear is rotatably mounted to the input member for rotation independent of the input member. A planet carrier, including a plurality of planet gears, is disposed about the sun gear. A ring gear is disposed about the planet gears and rotatably coupled to the hub body. A sun gear engagement clutch is positioned on the sun gear. A hub body engagement clutch is positioned on the hub body. A single shift ring is coupled to and rotates with the input member. The shift ring is positioned between the sun gear engagement clutch and the hub body engagement clutch. The shift ring has a first engagement clutch and a second engagement clutch. The shift ring is axially movable along the input member in a first direction toward the sun gear engagement clutch and in a second direction toward the hub body engagement clutch. Means is provided for shifting the shift ring. Upon movement of the shift ring in the first direction, the first engagement clutch of the shift ring engages the sun gear engagement clutch so that torque from the input member is transmitted by the shift ring to the sun gear through the planet carrier and ring gear to the hub body. Upon movement of the shift ring in the second direction the second engagement clutch of the shift ring engages the hub body engagement clutch so that torque from the input member is transmitted by the shift ring directly to the hub body.

The multi-speed wheel hub, as described above, provides an alternative configuration of multi-speed wheel hub to that described in the Watterodt and Stahlehi reference.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
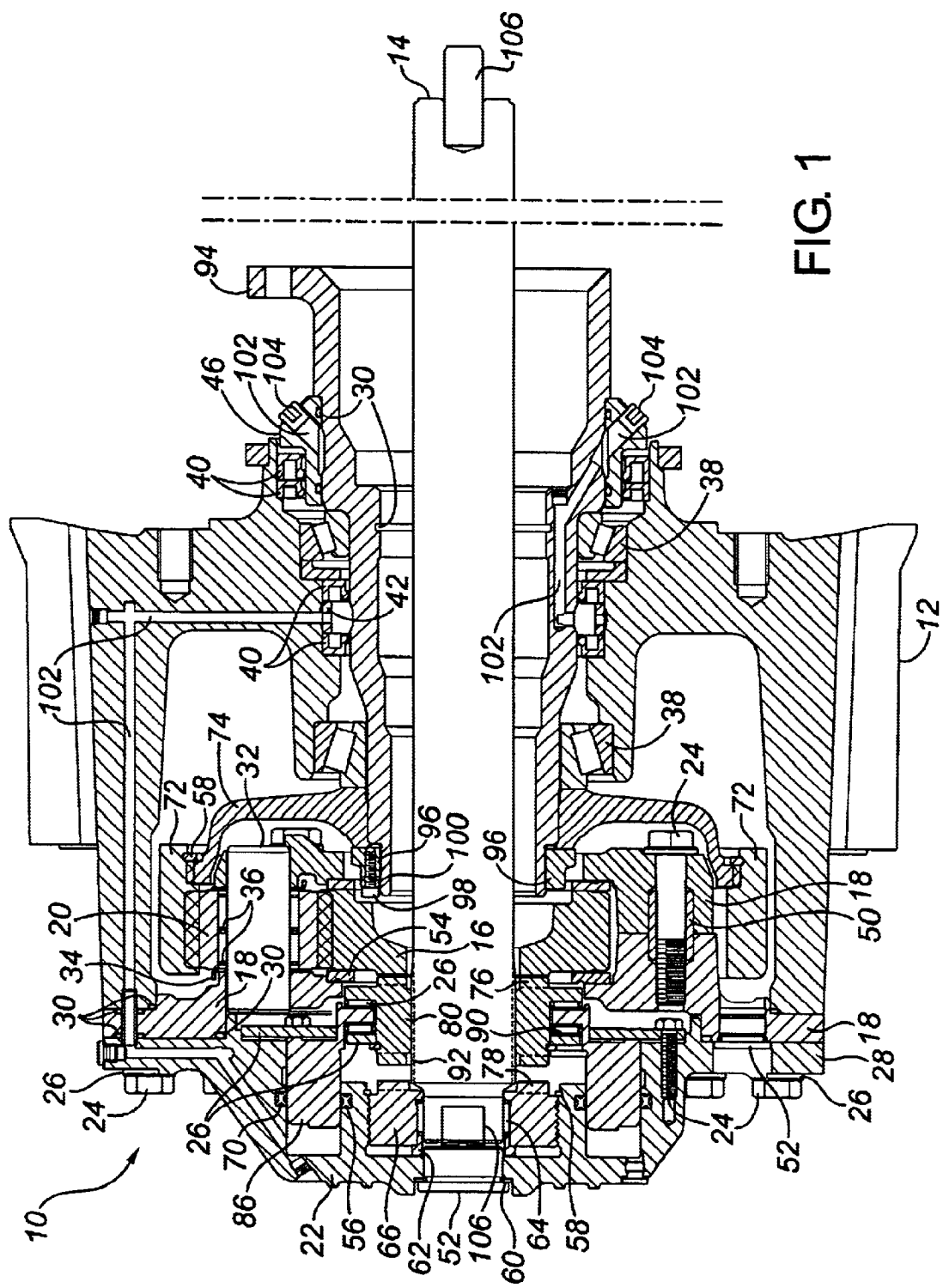
FIG. 1 is a side elevation view, in section of a multi-speed wheel hub constructed in accordance with the teachings of the present invention.

The preferred embodiment, a multi-speed wheel hub generally identified by reference numeral 10, will now be described with reference to FIGS. 1 through 3.

Structure and Relationship of Parts

Referring to FIG. 1, there is provided a multi-speed wheel hub 10, that includes a hub body 12 and an input member 14 disposed within hub body 12. A sun gear 16 is rotatably mounted to input member 14 for rotation independent of input member 14. A planet carrier 18, including a plurality of planet gears 20, is disposed about sun gear 16. Planet gears 20 are adapted to mesh with sun gear 16, so that when sun gear 16 rotates, sun gear 16 causes planet gears 20 to rotate. A ring gear 72 is disposed about planet gears 20 and rotatably coupled to the hub body 12. Ring gear 72 is adapted to mesh with planet gears 20 so that when planet gears 20 rotate, planet gears 20 cause ring gear 72 to rotate. Ring gear 72 is mounted on a ring gear carrier 74. A sun gear engagement clutch 76 is positioned on sun gear 16. A hub body engagement clutch 78 is positioned on hub body 12. A single shift ring 80 is coupled by a spined engagement 92 to and rotates with input member 14. Shift ring 80 is positioned between sun gear engagement clutch 76 and hub body engagement clutch 78. Referring to FIGS. 2 and 3, shift ring 80 has a first engagement clutch 82 and a second engagement clutch 84. Referring to FIG. 2, shift ring 80 is axially movable along input member 14 in a first direction toward sun gear engagement clutch 76. Referring to FIG. 3, shift ring 80 is axially movable along input member 14 and in a second direction toward hub body engagement clutch 78. Referring to FIGS. 2 and 3, a piston 86 is provided for shifting shift ring 80. Piston 86 is moved in the first direction by fluid pressure and is moved in the second direction by biasing springs 88. Referring to FIG. 1, an axial needle roller cage 90 is provided between piston 86 and shift ring 80. A splined engagement 92 is provided between shift ring 80 and input member 14 which allows shift ring 80 to rotate with input member 14 while also permitting lateral movement of shift ring 80 along input member 14.

There are a number of components illustrated in FIG. 1, that serve sealing, bearing, or other functions as will hereinafter be described. A stub axle 94 is provided between input member 14 and planet carrier 18. A nut 96 with a cylinder screw 98 surrounds stub axle 94. An adjusting washer 100 is provided between nut 96 and cylinder screw 98. Stub axle 94 has conduits 102 for supplying fluid pressure to move piston 86. Plugs 104 are provided for each conduit 102. Compression studs 106 are provided at both ends of input member 14. Hub body 12 has an end cover 22 which is held in place by screws 24 with washers 26. Planetary carrier 18 is coupled to hub body 12 with bushings 28 sealed with "O" ring seals 30. Planetary studs 32 are positioned in planetary carrier 18 upon which planet gears 20 rotate. Butting rings 34 and supporting washers 36 maintain the positioning of planet gears 20 on planetary carrier 18. Tapered roller bearings 38 are disposed between planetary studs 32 and planet gears 20 to facilitate rotation of planet gears 20. Conduits 102 which extend through hub body 12 to supply fluid to piston 86 necessitate a series of seals including oil seals 40, an intermediate ring 42, a v-ring 44, and a sub-axle ring 46 in which plug 104 is positioned. Planet carrier 18 is secured to hub body 12 by shear bushings 50 and screw plugs 52. Sun gear 16 and planet carrier 18 are separated by butting washers 54. The cylinder that piston 86 moves within is sealed by seals 56 and 70. Circlips 58 are used to secure ring gear 72 to ring gear carrier 74. A gauge shim 60 is positioned along cover 22 for relative adjustment of components. A clutch coupling sleeve 66 is provided which carries hub body engagement clutch 78. Spacing of clutch coupling sleeve 66 is provided with a spacer bushing 62. To facilitate relative rotational movement of clutch coupling sleeve 66 and input shaft 14, needle bearings 64 are provided.

Operation

The use and operation of multi-speed wheel hub will now be described with reference to FIGS. 1 through 3. Referring to FIG. 3, the biasing force of spring 88 moves piston 86 in a second direction. This maintains second engagement clutch of shift ring 80 normally engaged with hub body engagement clutch 78, providing direct drive with no gear reduction.

Figure 2:
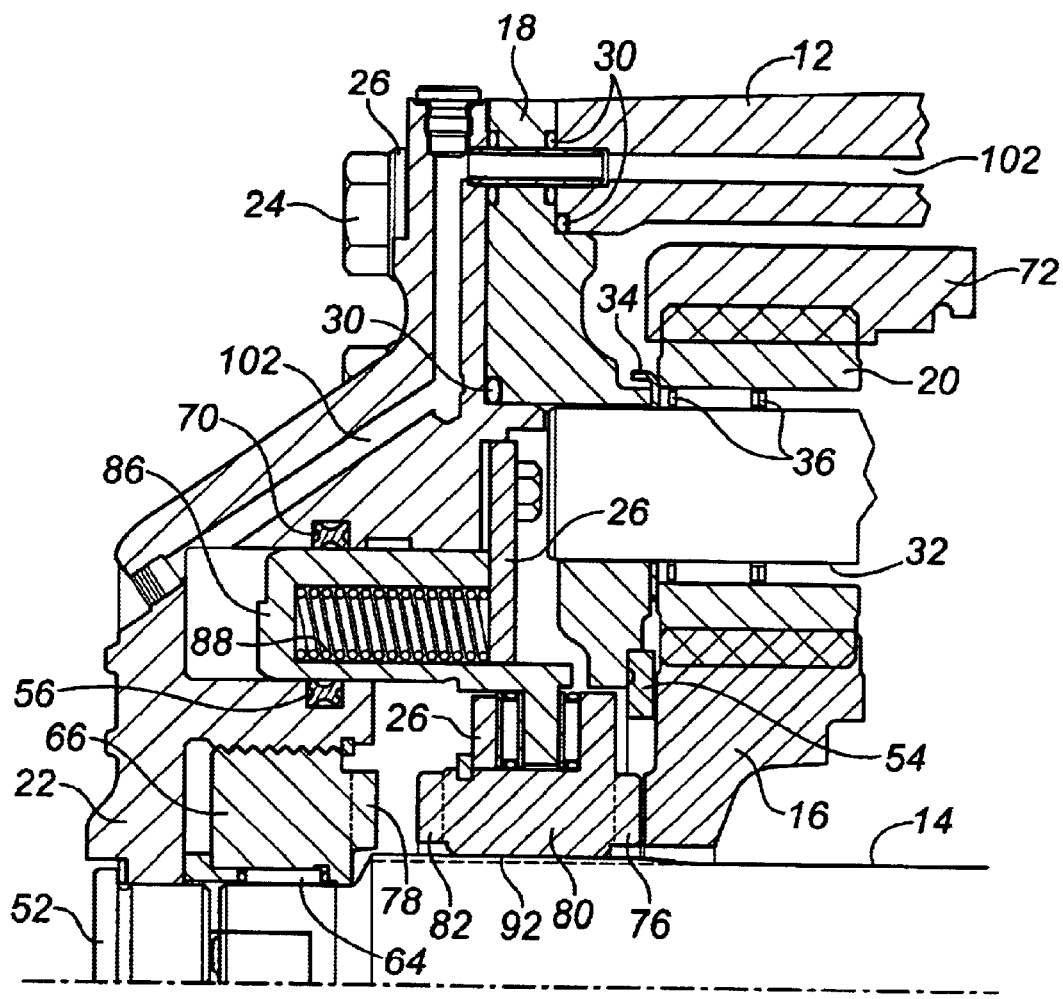
FIG. 2 is a detailed side elevation view, in section, of a portion of the multi-speed wheel hub illustrated in FIG. 1, showing the shift ring moved in the first direction with the first engagement clutch of the shift ring engaging the sun gear engagement clutch.

Referring to FIG. 2, when a gear reduction is desired fluid is supplied along conduit 102 to move piston 86 in a first direction. The fluid that is normally used in the system is air. Air is most conveniently taken from the vehicle systems. Piston 86 shifts shift ring 80 until first engagement clutch 82 of shift ring 80 engages sun gear engagement clutch 76. With this engagement torque from rotating input member 14 is transmitted by shift ring 80 to sun gear 16 to planet gears 20 and, in turn, to ring gear 72 of hub body 12 resulting in gear reduction.

Figure 3:
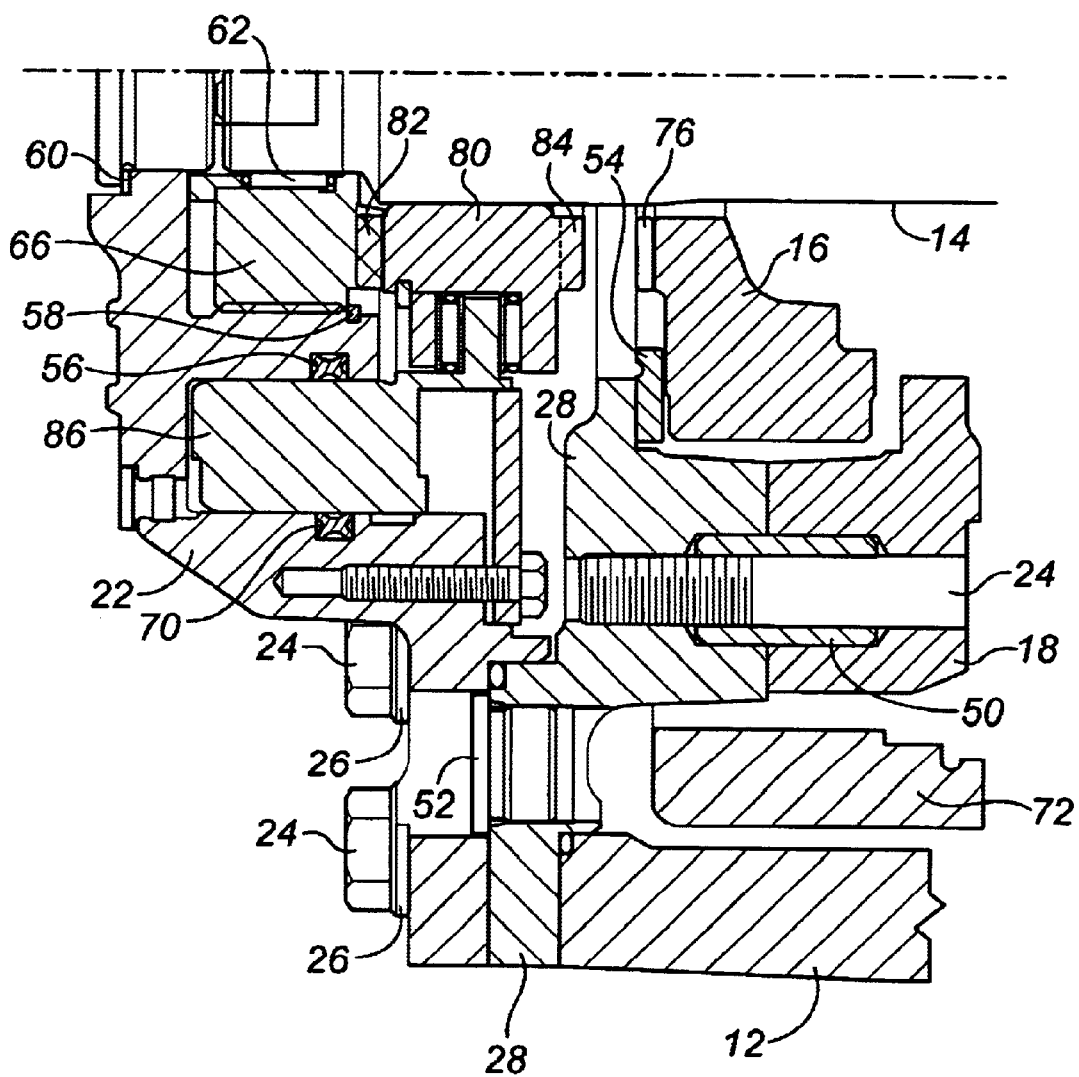
FIG. 3 is a detailed side elevation view, in section, of a portion of the multi-speed wheel hub illustrated in FIG. 1, showing the shift ring moved in the second direction with the second engagement clutch of the shift ring engaging the hub body engagement clutch.

Referring to FIG. 3, when pressure from fluid is relieved the biasing force of spring 88 causes movement of piston 86 back in the second direction. Piston 86 then shifts shift ring 80 until second engagement clutch 84 of shift ring 80 engages hub body engagement clutch 78. With this engagement torque from input member 14 is again transmitted by shift ring 80 directly to hub body 12 with no gear reduction.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A multi-speed wheel hub, comprising:
   a hub body;
   a rotating input member disposed within the hub body;
   a sun gear rotatably mounted to the input member for rotation independent of the input member;
   a planet carrier, including a plurality of planet gears disposed about the sun gear;
   a ring gear disposed about the planet gears and rotatably coupled to the hub body such that the hub body rotates about the ring gear;
   a sun gear engagement clutch on the sun gear;
   a hub body engagement clutch on the hub body;
   a single shift ring coupled to and rotating with the input member, the shift ring being positioned between the sun gear engagement clutch and the hub body engagement clutch, the shift ring having a first engagement clutch and a second engagement clutch, the shift ring being axially movable along the input member in a first direction toward the sun gear engagement clutch and in a second direction toward the hub body engagement clutch; and
   a piston for shifting the shift ring;
   wherein, upon movement in the first direction, the first engagement clutch of the shift ring engages the sun gear engagement clutch so that torque from the input member is transmitted by the shift ring to the sun gear, from the sun gear to the plurality of planet gears and through the planet carrier to the hub body;
   wherein, upon movement in the second direction, the second engagement clutch of the shift ring engages the hub body engagement clutch so that torque from the input member is transmitted by the shift ring directly to the hub body; and
   wherein the hub body has an end cover to which the hub body engagement clutch is secured and the piston is moved in a first direction by fluid pressure and is moved in a second direction by biasing springs.

2. The multi-speed wheel hub as defined in claim 1, wherein there is a splined engagement between the shift ring and the input member.

* * * * *